United States Patent Office 2,797,212
Patented June 25, 1957

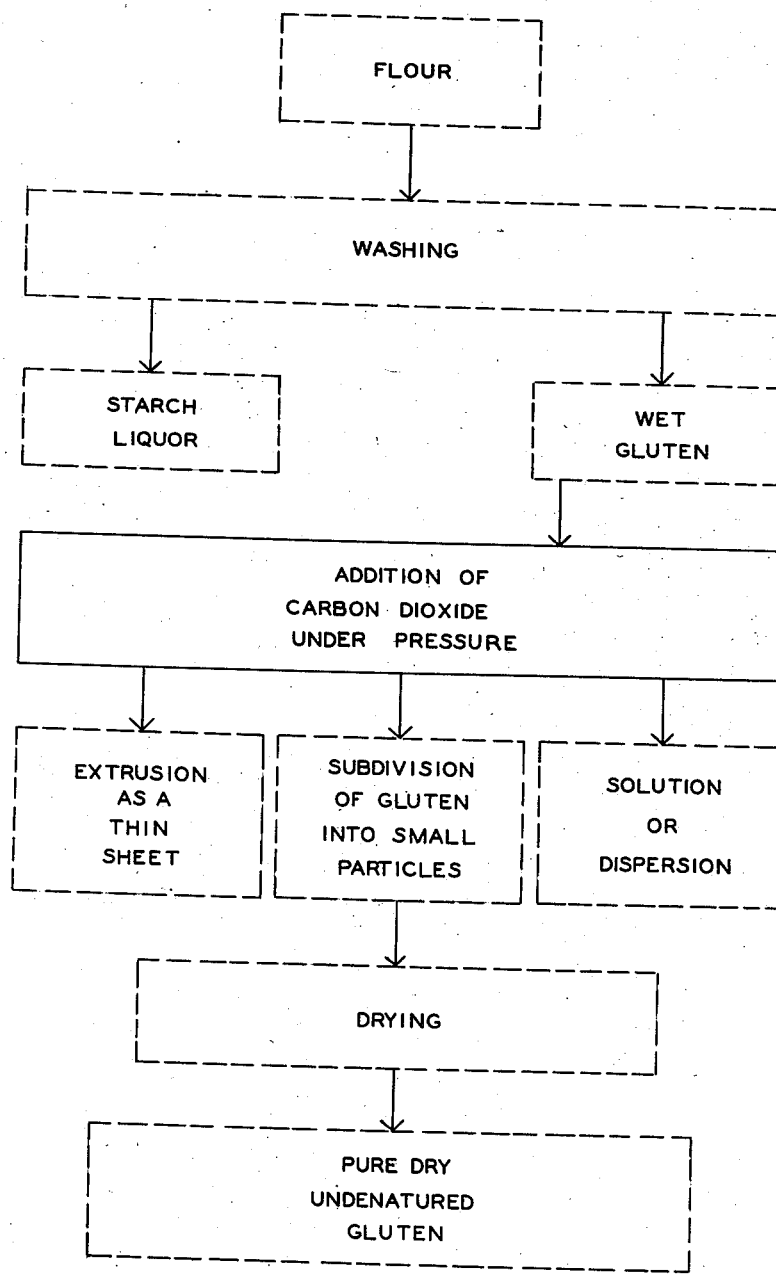

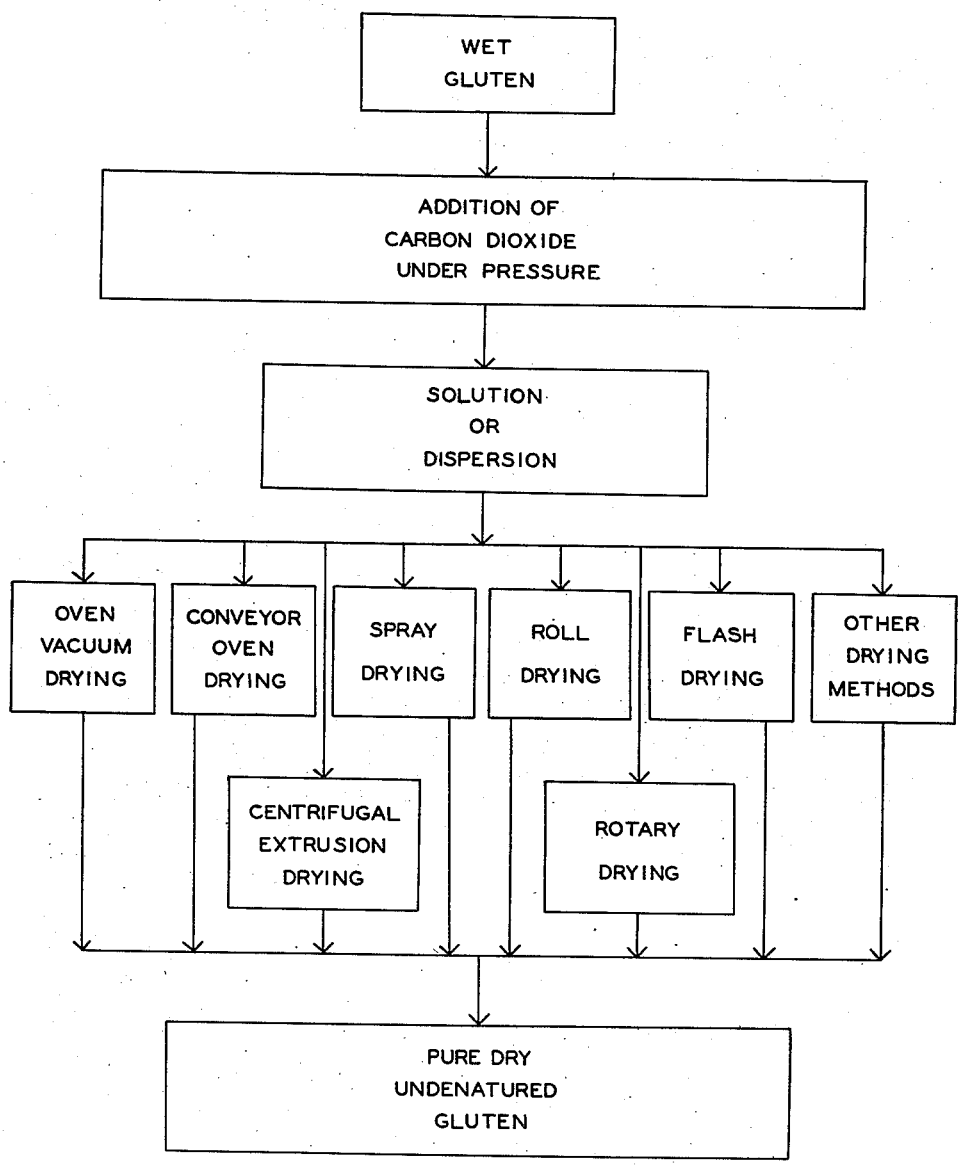

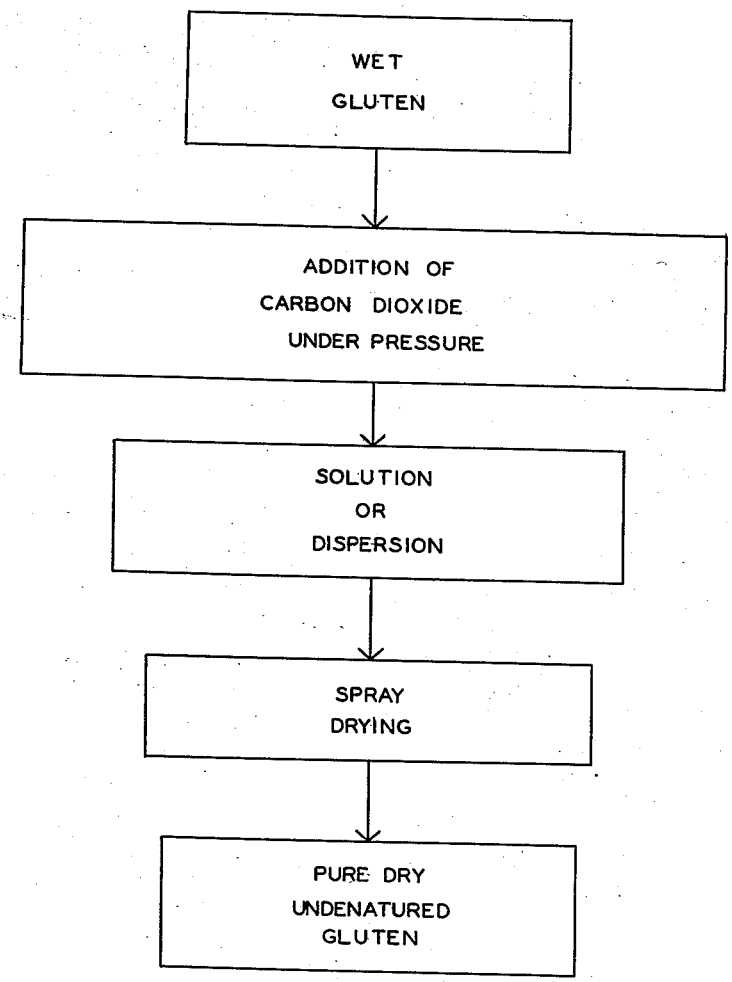

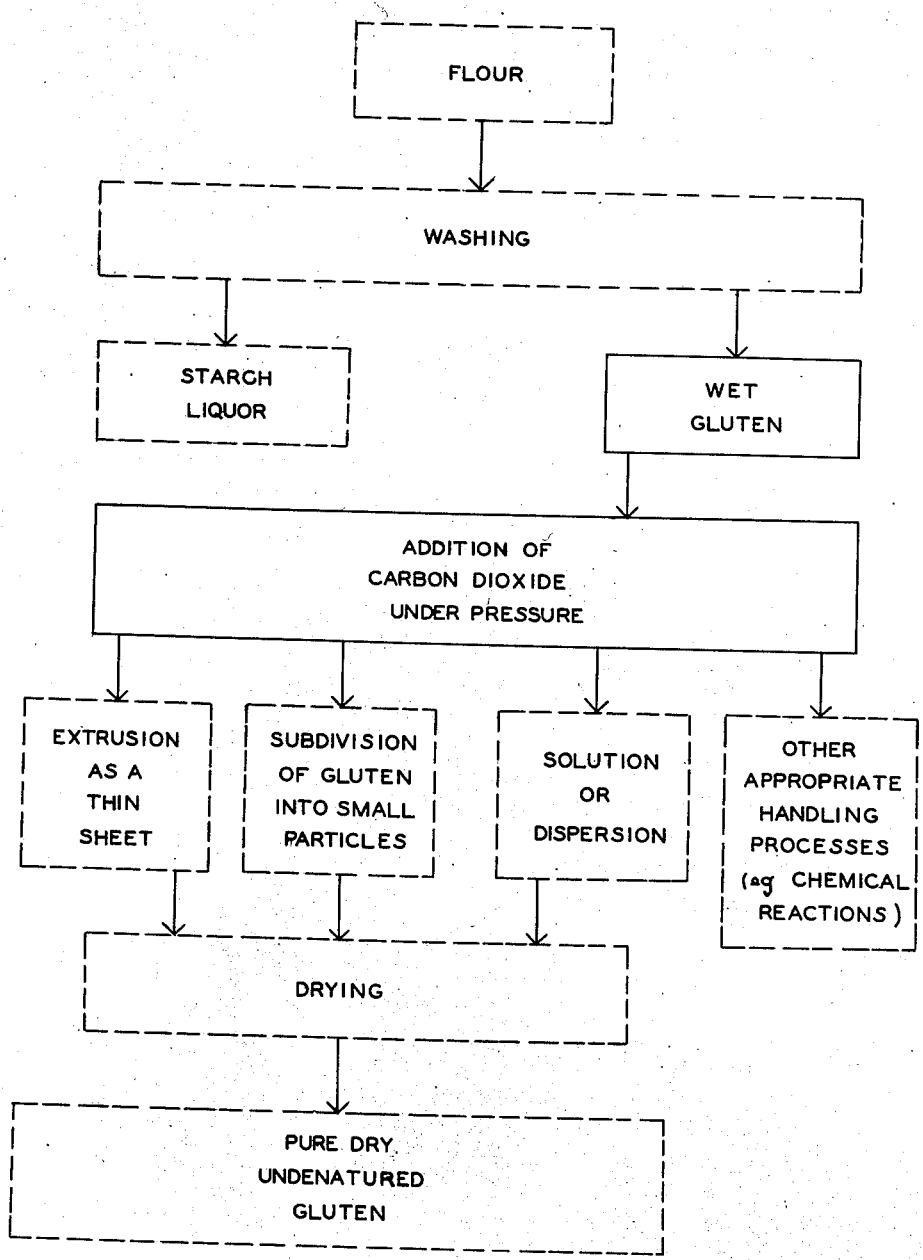

2,797,212

TREATMENT OF GLUTEN

Walter M. Miley and Levi M. Thomas, Worthington, and George M. Bierly, Grandview Heights, Ohio, assignors to The Keever Starch Company, Columbus, Ohio, a corporation of Ohio Application May 9, 1955, Serial No. 506,715

17 Claims. (Cl. 260—112)

This application is a continuation-in-part of our co-pending applications Serial Nos. 411,696, now abandoned, 492,347 and 492,348, now abandoned.

The invention disclosed in this application relates to processes for the drying of grain gluten to secure dry gum gluten.

When crushed grain, such as wheat flour, is processed to separate the starch and the gluten, one usual process includes the making of the flour into a dough and the washing of the dough several times with water to remove the starch as a starch liquor leaving the raw gluten as a wet gummy mass which is about one-third solids and is about two-thirds water held firmly bound in the mass. The solids are about 80–85% insoluble protein or protein-aceous material with the remainder consisting of a residue of starch, some insoluble fats (perhaps from 5–6%) and some fibre. The protein is generally considered as mainly glutelins and prolamins.

When gluten is separated from flour by washing (as explained above) it is usually dried to secure either dried gum gluten or dried devitalized gluten. Thus ordinarily the next step after the separation of the gluten from starch is the drying of this mass and the removal of the water therefrom. Where gum gluten is desired, this has been found to be difficult. One way of accomplishing this drying has been by the use of vacuum which is not altogether satisfactory.

Another method of drying previously proposed has required that the gluten be first dissolved or dispersed in water. This process of dissolving and/or dispersing is hereinafter in this specification and claims designated as "dispersing" or "dispersion." Inasmuch as the pure gum gluten will not disperse satisfactorily in either distilled water or natural water, it has been thought that something has to be added to the water in order to induce the gluten to disperse. It is known that the gluten will disperse in weak alkali or weak acid. The addition of either to the water or to the gluten normally introduces impurities into the gluten which are difficult to remove.

For example, we have heretofore dispersed gluten in a weak solution of lactic acid and spray dried the dispersion. We have also heretofore dispersed gluten in a weak solution of hydrochloric acid and spray dried the dispersion. Such experiments were not satisfactory because the gum gluten became rancid in too short a time. Whether this was due to the residue of the acid or to the action of the acid on some of the constituents of the raw gluten such as, for example, the fats, we do not know. However, we are convinced that dispersion with weak organic acids such as lactic, acetic, propionic, tartaric, citric and oxalic inevitably leave acids (or if neutralized, salts) which are harmful to the product, where one is seeking a pure undenatured, unmodified dry gluten. In this connection it must be emphasized that we are seeking to produce such a pure undenatured unmodified dry gluten which is known to the trade as "gum gluten" as distinguished from a modified impure or denatured gluten or devitalized gluten.

One of the outstanding characteristics of wet gluten is its cohesiveness. Even after separation, when rejoined it sticks together tenaciously and resists efforts to keep it separated. Another characteristic is its tendency to stick to other materials with which it may come in contact. The handling of this raw wet gluten is extremely difficult because of these characteristics of adhesiveness and cohesiveness.

The drying or removal of the firmly bound and entrapped water of the raw gluten has thus heretofore been extremely difficult. The raw gluten is extremely sensitive to heat. Many processes of drying have been proposed, but no matter what process of drying was heretofore proposed, considerable difficulty was encountered. In drying by the use of vacuum, for example, it has been found difficult and expensive to keep a vacuum high enough to accomplish the purposes desired, difficulties are often encountered in maintaining satisfactory quality, and a great deal of hand labor is required which in turn creates the necessity for stringent sanitary safeguards.

It has also been proposed to disperse the wet gluten in water to which there has been added, for example, a weak acid such as acetic, etc. Then it has been proposed to spray dry the dispersion. The product, however, retains the acid as an impurity which is quite objectionable, and if the additional step of neutralizing the acid is introduced, a salt is formed which also becomes an objectionable impurity. When usual acids are used, whether or not the acid remaining in the product effects a chemical reaction or not, it does produce a flavor or odor in the product which we consider objectionable. These impurities are difficult to remove.

Gluten is sometimes treated in such a way that it becomes devitalized. For certain purposes, we prefer that it not be devitalized. In recovering gluten as a pure undenatured, unmodified dry gluten that is not "devitalized," the gluten must not be cooked (i. e. subjected to high heat for any considerable period of time) during the process of drying inasmuch as, if the gluten is cooked, it becomes denatured or devitalized.

The pure undenatured gluten is used largely for mixing with wheat flour to prepare high protein bread for giving a more nearly perfect protein balance in diet than is possible with natural wheat flour bread. It is also used in macaroni and in diabetic foods.

We have heretofore in application Serial No. 411,696 which was filed February 23, 1954, which is now abandoned and of which this application is a continuation-in-part, disclosed processes of dispersing gluten in water by the use of carbon dioxide and of subsequently drying the gluten so dispersed either by spray drying or otherwise.

We have now discovered that by the treating of raw gluten with carbon dioxide, whether additional water is mixed with the gluten or not, the characteristics of the raw gluten are changed to a great extent so that we may dry it in several additional ways more easily than otherwise. Also (1) it is much easier to handle, to subdivide, to form into desired shapes or to treat otherwise; (2) certain chemical reactions which otherwise are impossible or difficult become possible and/or less difficult; (3) certain enzymatic reactions which otherwise are impossible or difficult become possible and/or less difficult; (4) the devitalization and drying characteristics are changed; etc.

OBJECTS

One object of our invention is, therefore, an improvement in processes of treating gluten.

A further object of our invention is an improvement in processes of drying gluten.

A further object of our invention is the provision of processes for the processing of gluten to obtain a pure undenatured, unmodified dried gluten.

A further object of our invention is the provision of an improved process for dispersing gluten in water.

A further object of our invention is an improved process for dispersing gluten and then drying the dispersion to produce a pure dry gluten.

A further object of our invention is the provision of an improved process of treating gluten with carbon dioxide.

Further features of our invention relative to the use of carbon dioxide as an agent in treating gluten and in inducing dispersion thereof include the features (1) that carbon dioxide is easily removed by evaporation, (2) carbon dioxide is very unreactive, so that even if a trace is left in the dried product it creates no difficulty, (3) carbon dioxide is not effective to induce any hydrolysis of the dried gluten, especially at the temperature and under the pressures used, and (4) carbon dioxide is actually desirable in bread making should any trace remain after drying and until the gluten is used.

Further objects and features of our invention should be apparent from the subjoined specification and claims when considered in connection with the accompanying drawings illustrating several embodiments of our invention.

DRAWINGS

Preferred embodiments of the invention have been chosen for purposes of illustration and description and are shown in the accompanying drawings forming part of the specification.

In the drawings:

Fig. 2 is a flow sheet illustrating several embodiments of the drying of gluten according to our invention;

Fig. 3 is a flow sheet illustrating specific applications of our invention directed specifically to the drying of dispersed gluten to produce undenatured gluten;

Fig. 4 is a flow sheet illustrating specifically an embodiment of our invention directed to spray drying of dispersed gluten; and Fig. 5 is a flow sheet illustrating various other embodiments of our invention.

DETAILED DESCRIPTION OF PROCESSES

Figure 1:
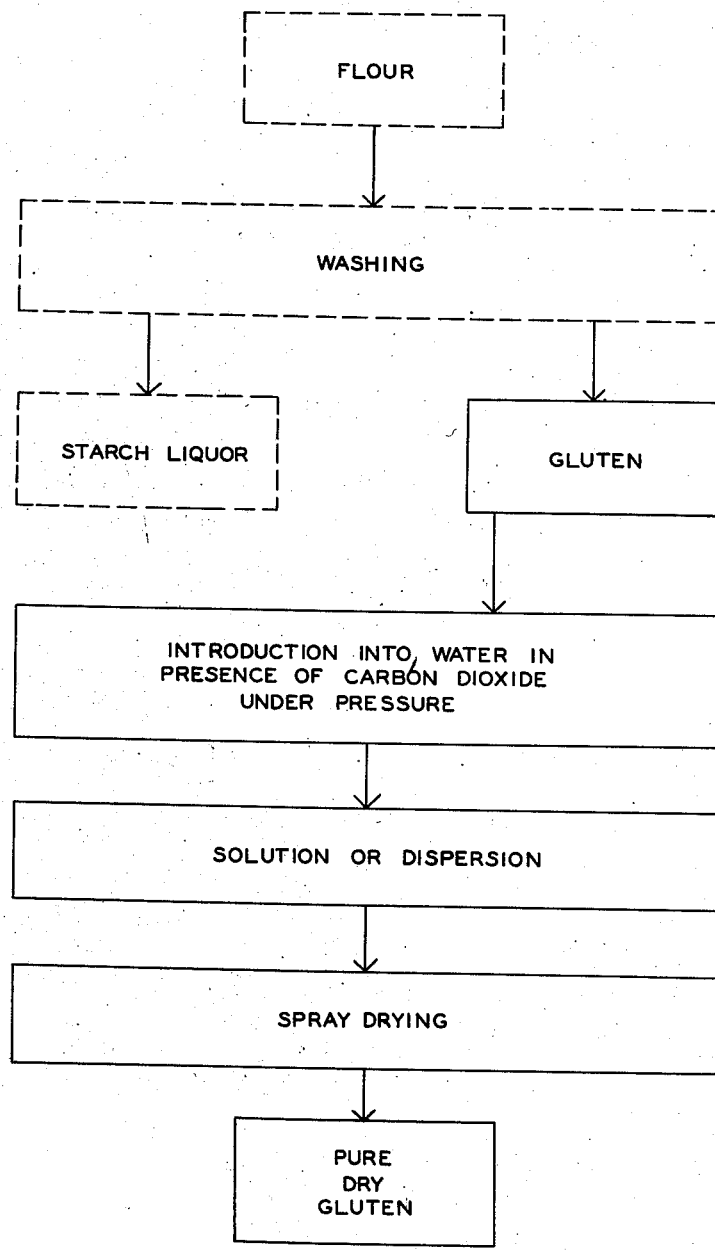
Fig. 1 is a flow sheet illustrating one embodiment of our invention.

We have discovered that when carbon dioxide under superatmospheric pressure is added to the raw wet gluten as it comes from the washing process the gluten becomes less cohesive, can be more easily separated into distinct or discrete particles, can be shaped more easily as desired and in general is more easily handled. Seemingly, its chemical composition is permanently affected only slightly, if at all, because after drying, the end product has the essential characteristics of pure undenatured gluten. However, we suspect that possibly the $CO_2$ reacts temporarily with certain end groups of the gluten in somewhat the same manner as it reacts with hemoglobin in the animal living process. If gluten so treated is introduced into water, or if wet gluten from the washing process is introduced into water in the presence of carbon dioxide under superatmospheric pressure, the gluten is easily dispersed or dissolved therein. We will speak of this phenomenon as "dispersing" or "dispersion" hereafter in this application, although there is some question as to whether or not the gluten is merely dispersed or is in part or wholly dissolved. We intend by "dispersing" or "dispersion" to include dispersing and dissolving and dispersion and/or solution. After dispersing, we may then dry the dispersion to secure a dry pure undenatured, unmodified gluten or "gum gluten."

Referring to Fig. 1 of the drawings, we have illustrated one embodiment of our improved process. The portion of the flow sheet shown in dotted lines indicates the usual or conventional separation of the starch from the wet gluten mass. Thereafter, as shown, this mass is introduced into water in the presence of carbon dioxide under pressure. According to one theory, the carbon dioxide combines with the water to form a weak solution of theoretical carbonic acid in which the gluten is dispersed easily either by the mere introduction of the gluten thereinto or preferably by agitation of the mixture, it being presumed that the acid neutralizes the forces of cohesion. Thereafter the dispersion is spray dried with a result that the water and carbon dioxide of the dispersion are evaporated leaving the pure dried gluten in the form of small flakes or beads, of light weight. We have found that a pressure of 30 pounds per square inch is satisfactory, but greater or lower pressures are also usable. As the carbon dioxide is used up in the process, additional quantities are pumped in under pressure.

In Fig. 2 of the drawings, we have illustrated several other embodiments of our improved process. The portion of the flow sheet shown in dotted lines at the top of the drawing indicates the usual or conventional separation of the starch from the wet gluten mass. Thereafter, as shown, this mass is treated with carbon dioxide under pressure. Thereafter, as again shown in dotted lines, the gluten (1) is prepared for drying in one of several ways and is dried leaving the pure dried gum gluten usually in the form of small flakes or beads of light weight.

In treating the raw gluten with carbon dioxide, we have found that a pressure of 30 pounds p. s. i. is satisfactory, but greater or lower pressures are also usable. After treatment of the gluten with carbon dioxide under pressure the gluten becomes easier to handle and may be extruded with relatively low pressure as a thin sheet which can be dried more easily.

The carbon dioxide treated gluten can be subdivided into small particles as for example by centrifugal extrusion as explained more in detail in copending application of Quentin R. Jeffries and Helmut J. Maier, Serial No. 478,566, filed December 30, 1954. This subdivision may by centrifugal extrusion be accomplished either without the addition of any more water as pointed out below in this application or with the addition of only small quantities of additional water.

The gluten treated with carbon dioxide may be milled and mixed (without the addition of any more water and without dispersion of said gluten) with previously dried gluten and then quickly dried either in a blast of heated air or by the application of heat from rolls or in a stream of heated air.

In Fig. 3 there is shown a flow sheet illustrating several methods used by us in the drying of a carbon dioxide gluten solution or dispersion. The gluten is thoroughly mixed with water in the presence of carbon dioxide under pressure, as for example, in an Abbe Dispersall (slotted draft tube type) mixer manufactured by the Abbe Engineering Company, 50 Church Street, New York, New York, under a carbon dioxide pressure of 30 lbs. p. s. i. This forms a thick solution or dispersion which is thereafter dried in any one of several ways.

For example, the solution or dispersion is pumped from the mixer to a series of pans which are manually delivered to a vacuum oven and retained therein for the necessary time and then removed with the gluten in the form of undenatured dried gluten. Again the solution or dispersion is pumped from the mixer to a Proctor and Schwartz drier where the dispersed gluten is sprayed onto an endless conveyor belt passing through a tunnel oven, a film of previously dried gluten being continuously maintained on the belt and onto which the dispersion is sprayed.

Again the solution or dispersion is pumped from the mixer to a series of pans carried by an endless conveyor where the gluten is dried by heat either at atmospheric pressure or utilizing a vacuum to draw off the water vapor.

The disperseion is sometimes delivered by a pump to the spray dryer where the dispersion is forced in small streams into a heated stream of air where it is dried by the heat thus obtaining small beads and flakes of pure dry gluten, the water and the carbon dioxide evaporating. In this operation Swenson spray drying equipment was used, manufactured by the Swenson Evaporator Company of Harvey, Illinois, and by Bowen Engineering Company.

Again the dispersion is pumped from the mixer to a centrifugal extrusion apparatus where it is dried in a heated stream of air as is explained more in detail in the above mentioned Jeffries et al. application Serial No. 478,566.

We pump the dispersion from the mixer to a pair of heated hollow rolls or drums set very close together and rotated toward each other so that a sheet of dispersed gluten is carried between the two drums and dries as a pair of thin sheets one of which adheres to each drum. This procedure is explained more in detail in copending application of Walter M. Miley and Howard W. Logsden, Serial No. 476,435, filed December 20, 1954.

Again we spray and mix the dispersed gluten from the Abbe mixer with a previously dried gluten and mill and treat in a stream of heated air to dry by flash drying in a manner similar to that explained in Weber Patent 2,559,551.

In another modification of flash drying, the dispersion is introduced into an inclined rotating tube where it is mixed (by spraying onto) with a previously dried product and moves downward in the tube while the mixture continuously is dried by a hot blast of air moving upward and by the heat of the tube which is steam heated.

In Fig. 4 the flow sheet shows a preferred process in which the gluten as it comes from the washers is introduced (in one embodiment which we use) into an inclosed mixer and there dispersed by agitation in the presence of carbon dioxide under pressure. It is then pumped to spray drying equipment where it atomized in a stream of heated air so that it dries as pure dry undenatured gluten. The mixer in this embodiment is provided with pipes by which (1) water is supplied, (2) carbon dioxide is supplied under pressure, (3) the dispersion is pumped from the mixer, and (4) by which the mixer may be vented. The mixer is also provided with a safety valve. The mixer is provided with a vaned or baffled cylindrical draft tube concentric with the walls of the container. A cupped rotor and a cupped stator each having a double row of cups tangentially are arranged below the draft tube and cooperate to subject the mix to both impact and shearing action while the mix is rapidly spiraled upward outside of the tube and downward therein and through the milling action of the rotor and the stator.

We have thus discovered that when the wet gluten from the washing process is introduced into water in the presence of carbon dioxide under superatmospheric pressure, the gluten is easily dispersed or dissolved therein and we can spray dry the dispersion to secure a dry pure undenatured unmodified gluten or "gum gluten," both the water and the carbon dioxide evaporating during the spray drying process. This leaves the pure dried gluten in the form of small flakes or beads of light weight. As the carbon dioxide is used up in the process, additional quantities are pumped in under pressure.

In this embodiment the spray dryer consists of a cone shaped drying chamber, a cooperating cone shaped liquid collector through which the gluten passes prior to entering the drying chamber, and a smaller collector in which the product is finally completely dried and collected. In one operation we used heated air having a temperature of about 380° F. at the inlet and from about 275° F. to 300° F. at the outlet.

Our process is usable on various forms of gluten including gluten derived from wheat, maize, rye, barley, rice and oats, but is primarily designed for processing of wheat gluten.

While we prefer to use our process of dispersing the wheat gluten by the use of carbon dioxide under pressure in combination with spray drying because the combination of the two steps produces a desirable product in a new efficient, economical and effective way, yet we realize that wheat gluten dispersed by the use of carbon dioxide under pressure in accordance with our invention can be dried in other ways such as by vacuum, oven drying, flash drying and extrusion drying.

We prefer to maintain the dispersion step at room temperature (i. e. under 100° F.). Even during the spray (or other drying) step we prefer keeping the temperature of the gluten from being high for any long period. In spray drying, the temperature of the air may be as high as 450° F., but the rapid evaporation of water keeps the temperature of the gluten low until it is dried. The gluten only remains in such high temperature zone for an instant.

Referring to Fig. 5 of the drawings we have illustrated several additional embodiments of our improved process. The portion of the flow sheet shown in dotted lines at the top of the drawing again indicates the usual or conventional separation of the starch from the wet gluten mass. Thereafter, as shown, this mass is treated with carbon dioxide under pressure. Thereafter, as again shown in dotted lines, the gluten (1) is prepared for drying in one of several ways and is dried leaving the pure dried gluten in the form of small flakes or beads of light weight or (2) the gluten is handled in other ways.

The carbon dioxide treated gluten can be dissolved or dispersed in water and thereafter dried as explained more in detail later in this application.

The carbon dioxide treated gluten can be treated in other ways. It will react with certain chemicals which do not react with untreated gluten. For example, it reacts with alkaline earth metals such as calcium hydroxide to obtain an alkaline earth metal salt of a protein complex (e. g. a calcium salt of a gluten complex).

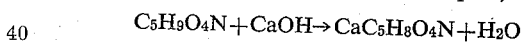
$$C_5H_9O_4N + CaOH \rightarrow CaC_5H_8O_4N + H_2O$$

The carbon dioxide treated gluten also undergoes certain enzymatic reactions differing from the corresponding reactions of the untreated gluten.

EXAMPLES

Following are examples of the practice of our inventions:

*Example I*

We put wheat gluten in natural water in a Waring blendor which was then placed in a hermetically sealed container. We introduced carbon dioxide into the container under 30 pounds pressure. We started the Waring blendor. At the end of two minutes the gluten was thoroughly dispersed in the water.

*Example II*

We took wet wheat flour gluten in masses as it came from the starch washing processes in the mill and introduced it continuously into a tank of water maintaining an atmosphere of carbon dioxide above the water under a pressure of 30 pounds per square inch. We pumped this dispersion continuously through spray dryers wherein it was forced into the atmosphere in small streams in the presence of heat and thus obtained small beads and flakes of dry pure gluten, the water and the carbon dioxide evaporating.

*Example III*

We put 100 lbs. of wet gluten (obtained from a starch washer) in a 55 gallon closed pressure container together with about 45 gallons of water and we introduced 2 lbs. 7 oz. of $CO_2$ under 30 pounds pressure. We agitated the mixture and a milky dispersion was soon obtained,

Example IV

We put 55 gallons of water in a 55 gallon closed pressure container so as to substantially fill the container. We introduced $CO_2$ under pressure. It required 2 lbs. of $CO_2$ to raise the pressure to 30 lbs. p. s. i. (i. e. 0.58 oz. of $CO_2$ per gallon of water approximately). We emptied the container and put 100 lbs. (or about 10 gallons) of raw wet gluten in the container. We filled the container with water to the same level as previously. Inasmuch as the wet gluten consisted of about 65% entrapped water, this included about 35 lbs. of dry gluten. We introduced $CO_2$ under pressure and found that it required 2 lbs. 7 oz. of $CO_2$ to raise the pressure to 30 lbs. per square inch. According to our computations, this indicated that 8.37 oz. of $CO_2$ was absorbed by the 35 lbs. of dry gluten and we believe that this 8.37 oz. of $CO_2$ was reacted with the amino groups of the amino acids of the gluten.

Example V

Wet wheat gluten as it came from the starch washing processes in the mill was introduced continuously into a closed mixer, water also being introduced continuously and an atmosphere of carbon dioxide being maintained above the mixture under a pressure of 30 lbs. p. s. i. and a proportion of about 4 parts of water to 3 parts of wet gluten being maintained so as to prepare a dispersion having 14% solids.

Example VI

We pumped a dispersion obtained as in Example III continuously through spray dryers wherein it was forced into a heated atmosphere in small streams in the presence of heat. The spray dryer included a large cone shaped drying chamber into which the gluten was atomized downward as a spray in the center and heated air was introduced tangentially so as to swirl upward and through a large pipe to a cyclone dry collector and then through a bag filter to an exhaust stack to the atmosphere, the product being collected from the bottom of the drying chamber, the bottom of the dry collector and the bottom of the bag filter, as small beads and flakes of dry pure gluten, the water and carbon dioxide evaporating.

Example VII

About 100 lbs. of wet gluten (obtained from a starch washer) was placed in a 55 gallon closed pressure container together with about 45 gallons of water and 2 lbs. 7 oz. of $CO_2$ under 30 lbs. pressure was introduced. The mixture was agitated and a milky dispersion was soon obtained. This was pumped to pans which were carried on a conveyor through a vacuum oven and dried undenatured gluten was obtained.

Example VIII

A dispersion of wheat gluten in water dispersed by means of carbon dioxide under pressure as described in Example II was dried by being passed through a Proctor and Schwartz conveyor belt dryer to obtain pure dry undenatured gum gluten.

Example IX

A dispersion of gluten prepared as described in Example III was pumped to a series of pans which were placed in a vacuum oven where they were left for three hours at a temperature of approximately 112° F. and under a vacuum of about 28 inches of mercury. On removal, pure undenatured gum gluten was obtained.

Example X

Wet wheat gluten as it came from the starch washing processes in the mill was introduced continuously with water into a closed mixer, water also being introduced continuously, while an atmosphere of carbon dioxide was maintained above the mixture under a pressure of 30 pounds per square inch and a proportion of about 1 part of water to 3 parts of wet gluten was maintained so as to prepare a dispersion having about 25% solids. This dispersion was pumped through a centrifugal dryer as disclosed in the above mentioned Jeffries et al. application Serial No. 478,566 to obtain pure undenatured dry gluten.

Example XI

We put 100 lbs. of wet gluten (obtained from a starch washer) in a 55 gallon closed pressure container together with about 45 gallons of water and we introduced 2 lbs. 7 oz. of $CO_2$ under 30 lbs. pressure. We agitated the mixture and a milky dispersion was soon obtained. We pumped this to a pipe suspended above a pair of heated rolls and allowed the liquid to flow between the rolls as they were rotated at 8 R. P. M. toward each other. The rolls were heated to 158° C. (316° F.) by steam under 70 lbs. per square inch pressure which was introduced into the hollow of the rolls. The dried film of gluten was scraped from the rolls at a point of about a half of a revolution thereof from the point at which the liquid was deposited and the scrapings were conveyed to a mill where they were ground. We obtained about 35 lbs. of white undenatured dried gluten of relatively light weight and superior baking qualities. The pipe which supplied the liquid to the rolls was connected to the shaft of one of the rolls so that the outlet end of the pipe reciprocated from one end of the rolls to the other end and back during each revolution of the rolls.

Example XII

A dispersion of wheat gluten in water dispersed by means of carbon dioxide under pressure was dried by spraying on to and mixing with a supply of previously dried gluten and then milling in a stream of heated air.

Example XIII

We took wet wheat gluten as it came from the starch washing processes and placed it in a container with carbon dioxide above it. We then extruded the gluten as a thin sheet through a slit in the bottom of the container by exerting pressure on the top thereof. This sheet was dried by heat.

Example XIV

We put wet gluten in a Waring blendor which was then placed in a hermetically sealed container. We introduced carbon dioxide into the container under 30 lbs. pressure. We started the Waring blender. After a short time the gluten was subdivided into small particles.

Example XV

Gluten treated as described in Example V was mixed with calcium hydroxide. It reacted to form a calcium salt of a gluten complex.

Example XVI

Wet wheat gluten as it came from the starch washing processes in the mill was introduced into a closed mixer, water being also introduced, and an atmosphere of carbon dioxide above the mixture under a pressure of 30 pounds per square inch and a proportion of about 7 parts of water to 3 parts of wet gluten being maintained so as to prepare a dispersion having 10% solids. This dispersion was introduced into the upper end of a rotating tube and there mixed with previously dried gluten. The whole mixture was dried by heat.

Example XVII

Gluten treated as described in Example III was extruded centrifugally as described in Jeffries et al. application Serial No. 478,566 and dried by heated air.

Example XVIII

We put wet gum gluten together with dry gum gluten at a ratio of 10 parts dry to one part wet in a Waring blendor which was then placed in a hermetically sealed container. We introduced carbon dioxide into the container under 30 pounds pressure. We started the Waring blendor. At the end of a few minutes the wet gluten was thoroughly mixed with the dry gluten and both were broken into small particles. This mixture was then thoroughly dried over heat.

UTILITY

Pure dry undenatured gluten is used for many purposes as food for supplying additional vegetable protein to diets. It is at times added to patent wheat flour to enrich it in protein content. It is also used in macaroni and in diabetic foods.

It is to be understood that the above described embodiments of our invention are for the purpose of illustration only and various changes may be made therein without departing from the spirit and scope of the invention.

We claim:

1. A process of producing pure dry undenatured gluten which comprises dispersing wet gluten in water in the presence of carbon dioxide under pressure and then spraying the dispersion in the presence of heat without additions to neutralize the dispersion to dry the gluten.

2. A process of treating wet gluten which comprises dispersing it in water in the presence of carbon dioxide under pressure.

3. A process of producing pure dry gluten which comprises introducing wet gluten into water in the presence of carbon dioxide under superatmospheric pressure, and then spraying the liquid including the gluten into the atmosphere in the presence of heat.

4. A process of producing pure dry undenatured gluten which consists of introducing wet gluten into water in the presence of carbon dioxide under superatmospheric pressure, agitating the water and gluten while maintaining them in the presence of the carbon dioxide under superatmospheric pressure to disperse the gluten, and then subdividing the dispersed gluten so that it may dry in discrete particles.

5. A process of treating wet gluten which comprises supplying carbon dioxide under superatmospheric pressure to said gluten to create a carbon dioxide gluten.

6. A process of producing pure dry gluten which comprises treating wet gluten with carbon dioxide under pressure and then drying.

7. A process of producing pure dry gluten which comprises contacting wet gluten with carbon dioxide under superatmospheric pressure, separating the gluten into discrete particles, and then drying the gluten in the presence of heat.

8. A process of treating wet gluten which comprises supplying carbon dioxide to said gluten under superatmospheric pressure to create a carbon dioxide gluten, and thereafter mixing the carbon dioxide gluten with an alkaline earth metal hydroxide to obtain an alkaline earth salt of a protein complex.

9. A process consisting of supplying carbon dioxide under superatmospheric pressure to wet gluten to produce a carbon dioxide gluten and thereafter separating the carbon dioxide gluten into discrete particles.

10. A process consisting of supplying carbon dioxide under superatmospheric pressure to wet gluten to create a carbon dioxide gluten and thereafter extruding the carbon dioxide gluten under pressure.

11. A process of treating wet gluten which comprises dispersing it in water in the presence of carbon dioxide under pressure and thereafter drying the dispersion.

12. A process of producing pure dry gluten which comprises washing wheat flour to separate starch from the gluten, treating the wet gluten with carbon dioxide and water under superatmospheric pressure to disperse the gluten in the water and then drying the dispersion including the gluten in the presence of heat.

13. A process of producing pure dry gluten which comprises introducing wet gluten into water in the presence of carbon dioxide under superatmospheric pressure, and then conveying the dispersion through an oven on an endless conveyor.

14. A process of producing pure dry wheat gluten which comprises dispersing wet gluten in water in the presence of carbon dioxide under pressure and then drying the dispersion in a vacuum oven.

15. A process of producing pure dry gluten which comprises contacting wet gluten with carbon dioxide under superatmospheric pressure, extruding the gluten in a thin sheet, and then drying the gluten in the presence of heat.

16. A process of producing pure dry gluten which comprises treating wet gluten with carbon dioxide under pressure, mixing with previously dried gluten and then drying in the presence of heat.

17. A process for producing a wheat gluten product which comprises washing wheat flour to separate starch from the gluten, and supplying carbon dioxide to the wet gluten under pressure to produce a carbon dioxide gluten.

No references cited.